Nov. 6, 1962 W. F. EGBERT ET AL 3,062,006
AFTERBURNER COMBUSTION APPARATUS
Filed Oct. 7, 1959 3 Sheets-Sheet 3
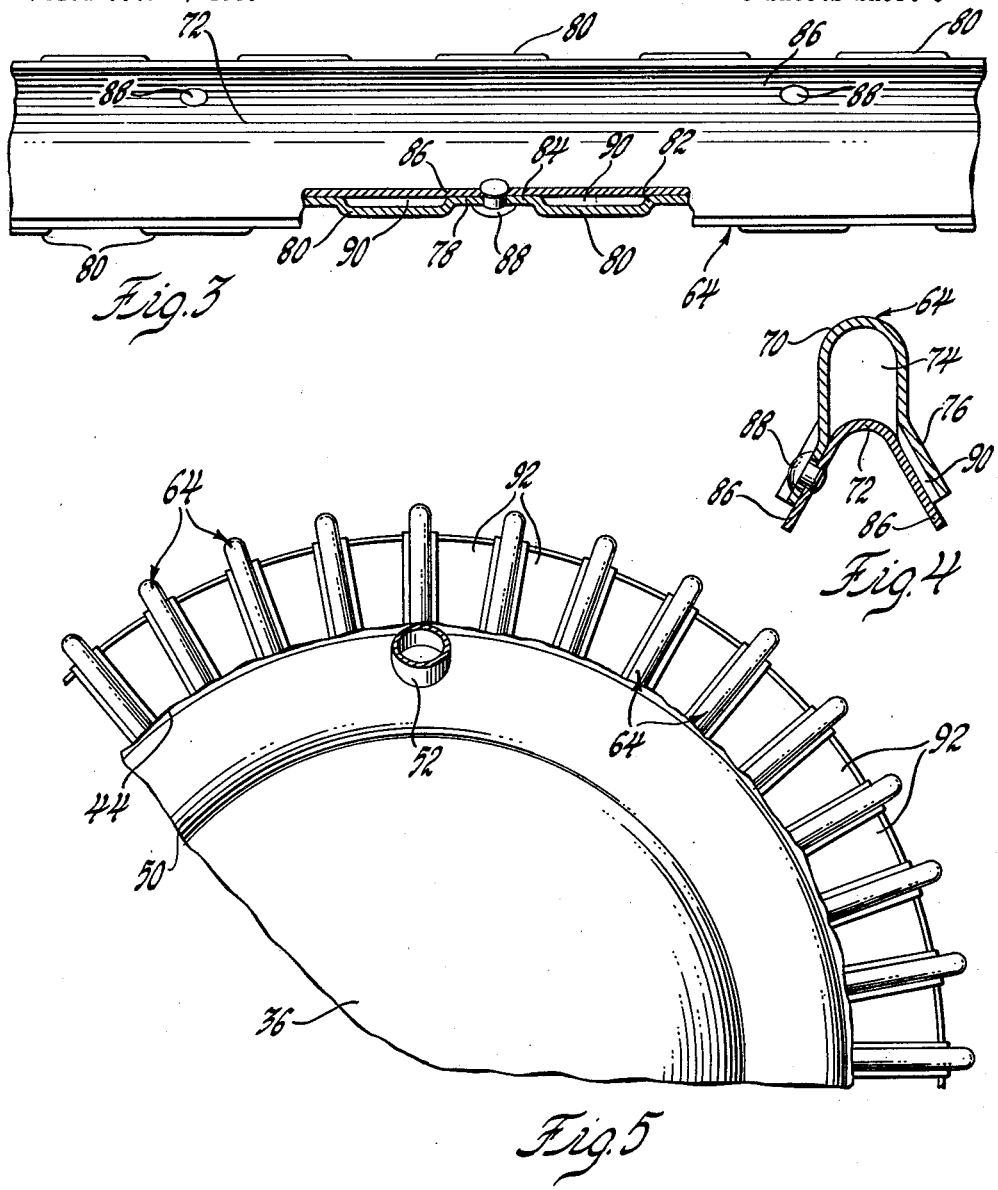
INVENTORS
William F. Egbert &
BY Esten W. Spears, Jr.
Robert E. McCollum
ATTORNEY

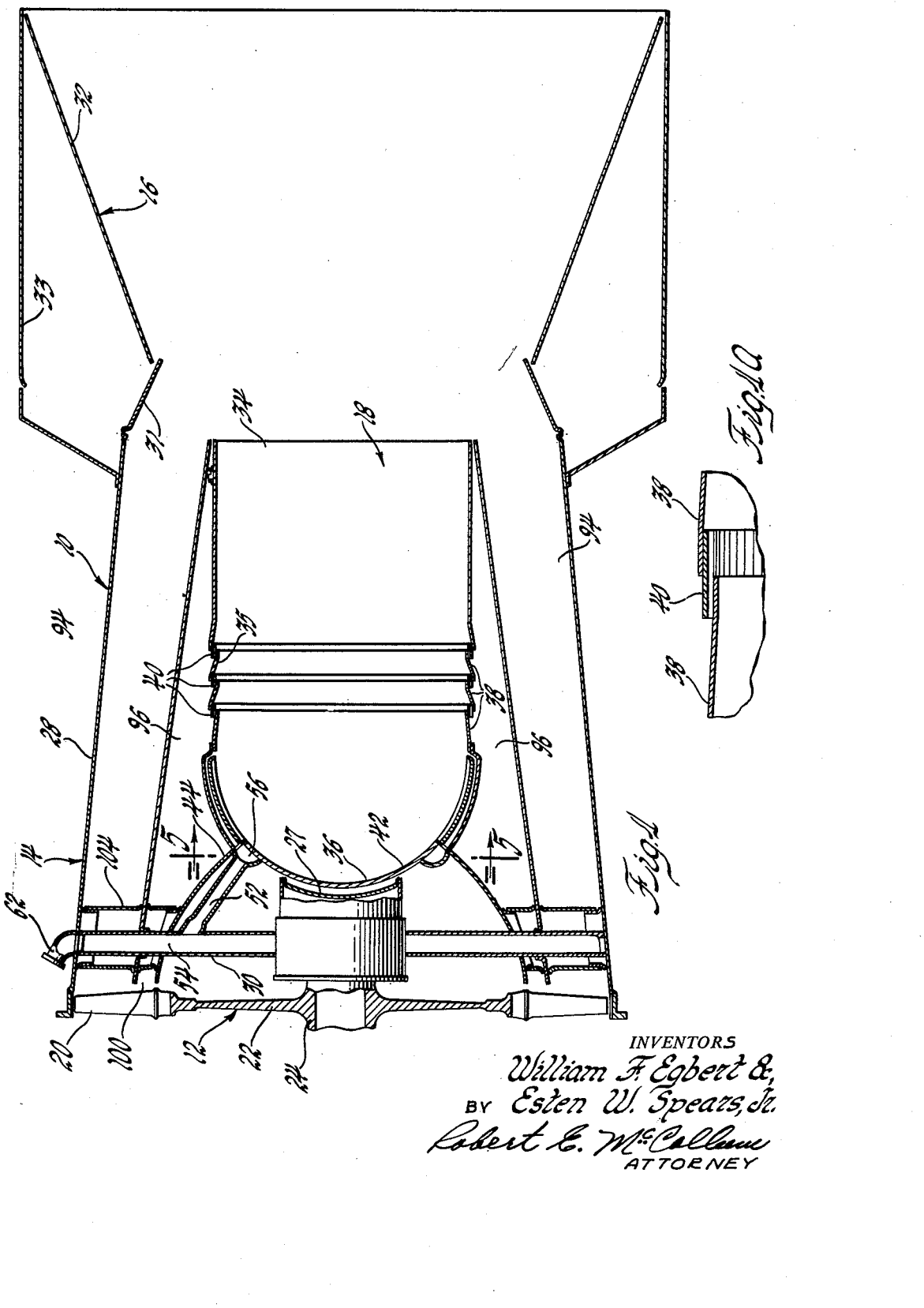

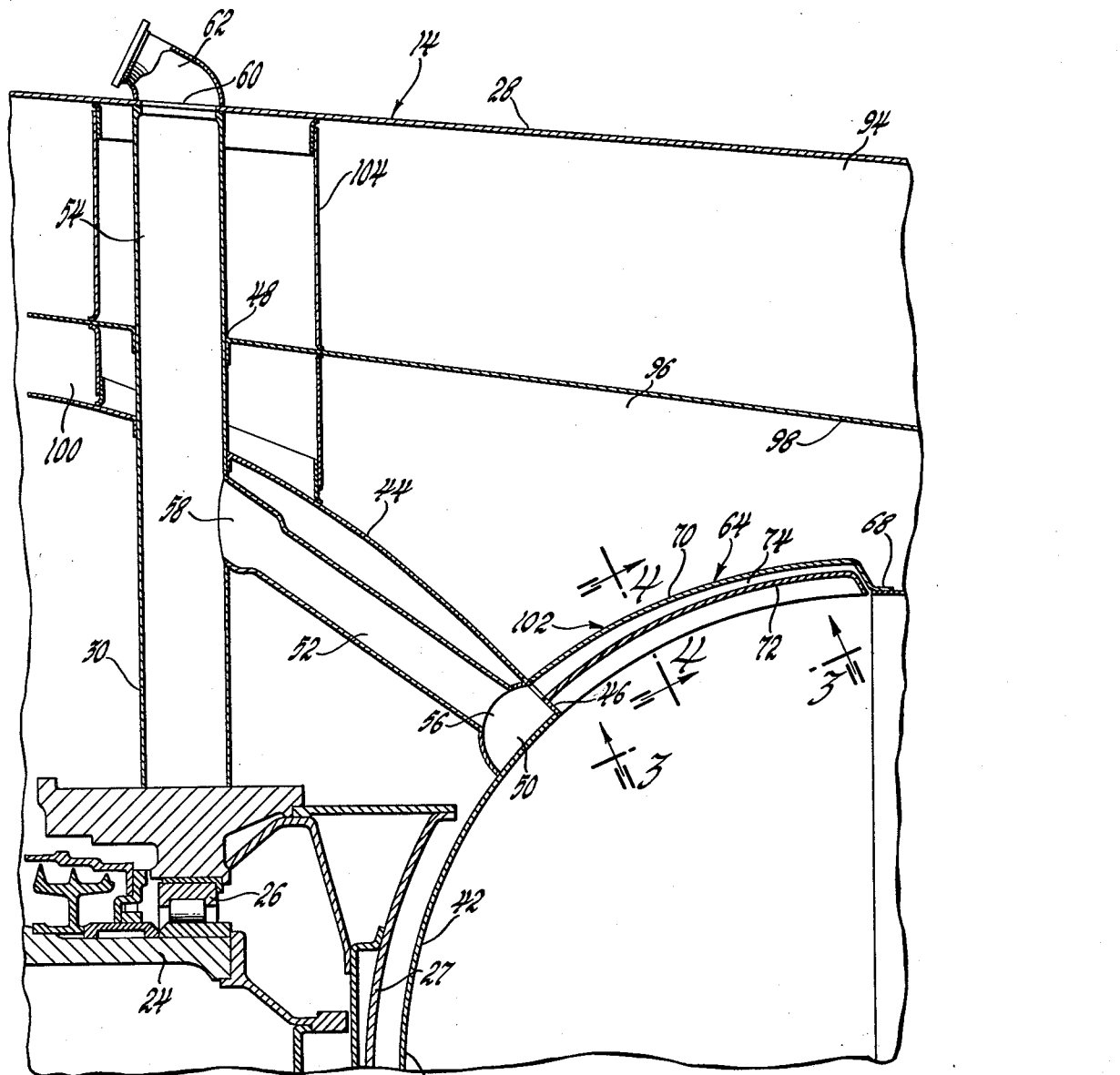

United States Patent Office 3,062,006
Patented Nov. 6, 1962

3,062,006
AFTERBURNER COMBUSTION APPARATUS
William F. Egbert, Brownsburg, and Esten W. Spears, Jr., Indianapolis, Ind., assignors to General Motors Corporation, Detroit, Mich., a corporation of Delaware
Filed Oct. 7, 1959, Ser. No. 845,592
11 Claims. (Cl. 60—39.6)

This invention relates to a combustion apparatus, and more particularly, to a gas turbine engine afterburner of a construction to produce a low amount of thrust augmentation in an efficient, economical manner.

In many afterburner installations, because of the large volume of exhaust gases passing into the relatively unrestricted afterburner section, a large quantity of fuel must be fed thereinto in order to provide a fuel-air ratio giving efficient combustion and preventing lean blow-out. With such a large quantity of fuel, however, a relatively large thrust augmentation results, which in many instances is undesirable. Therefore, the problem exists at times of either not having enough thrust, without an afterburner, or having too much, with afterburning.

This invention eliminates the above-mentioned problem by providing an afterburner construction wherein only the quantity of fuel necessary to produce the desired amount of thrust augmentation is used, and combined with only that portion of the exhaust gases necessary to provide the most efficient fuel-air ratio, the remaining exhaust gases bypassing the afterburner.

Therefore, it is an object of this invention to provide an afterburner construction for use in a turbomachine, wherein a portion of the exhaust gases passing therethrough to the exhaust nozzle is diverted into a combustion chamber to provide a controlled amount of thrust augmenting the thrust produced by the normal flow of the exhaust gases out of said nozzle.

It is a further object of this invention to provide a combustion chamber of a construction efficiently mixing the fuel therein with only a portion of the exhaust gases passing into the exhaust nozzle to provide a controlled thrust augmentation therefrom.

Other objects, features, and advantages will become apparent upon reference to the detailed description of the invention which follows, and to the drawings illustrating the preferred embodiment of the invention, wherein:

FIGURE 1 is a schematic longitudinal sectional view of a portion of a gas turbine engine embodying the invention;

FIGURE 1A is a fragmentary enlarged view of a portion of FIGURE 1;

FIGURE 2 is an enlarged view of a portion of FIGURE 1;

FIGURE 3 is an enlarged view with parts broken away and in section of a detail of FIGURE 2 taken on a plane indicated by and viewed in the direction of the arrows 3—3 of FIGURE 2;

FIGURE 4 is an enlarged cross sectional view of a detail taken on a plane indicated by and viewed in the direction of the arrows 4—4 of FIGURE 2; and, FIGURE 5 is a front elevational view with parts broken away of a portion of the FIGURE 2 construction.

Referring to the drawings and more particularly to FIGURE 1, there is shown schematically therein the aft or downstream portion 10 of a gas turbine engine including the final or last stage turbine rotor assembly 12, an afterburner section 14, and a variable convergent-divergent exhaust nozzle 16. Positioned centrally within the afterburner section is a single combustion can or liner 18 adapted to be supplied with fuel and air in a manner to be described for the burning therein of the mixture to produce a thrust augmenting the thrust from the exhaust gases of the turbine.

As stated previously, this invention provides an afterburner construction such that for any desired amount of thrust augmentation by the afterburner, only that amount of fuel is supplied to the combustion liner, which when properly combined with the correct amount of exhaust gas produces the most efficient burnable mixture to obtain the particular desired amount of thrust augmentation, and only the specific amount of exhaust gas needed in this instance is by-passed or diverted from the regular stream of gas passing from the turbine into and through the exhaust system.

Referring now to the details, the rotor assembly 12 includes a plurality of circumferentially spaced rotor blades 20 secured to a turbine wheel or disk 22 for rotation thereof, the turbine wheel being formed integral with a sleeve shaft 24 supported for rotation upon a bearing means 26 in turn supported from the engine casing 28 by a plurality of circumferentially spaced tubular strut means 30 (only one shown). The details of the gas turbine engine further upstream of the portion already described are known and are immaterial to an understanding of the present invention and therefore will not be described. Suffice it to say, however, that the engine has compressor and combustion sections delivering motive fluid to the turbine stages to drive the blades therein, which in turn drive the main drive shaft through sleeve shaft 24.

The construction of the convergent-divergent nozzle 16 is known to those skilled in the art to which this invention pertains, is immaterial to an understanding of the invention, and therefore is shown only schematically, having a convergent annular section 31 pivoted to the casing 28 and to a divergent annular section 32 in turn pivoted to a boattail member 33 pivoted at its opposite end to the casing, and adapted to be actuated by any suitable means (not shown).

Referring now to the construction of the afterburner section 14, axially spaced from the bearing 26 by a heat shield 27, and aligned with sleeve shaft 24 is the single tubular combustion can 18 having an open outlet end 34, a body portion 35, and an inlet portion 36. The outlet end 34 as shown opens into the exhaust nozzle 16. The body or main portion 35 of the can 18 comprises a number of nester annular hollow sections 38 having circumferentially corrugated spacer elements 40 therebetween and welded thereto, the corrugations of the spacer element providing cooling passages between sections to insulate the liner from the flames therein. The inlet end 36 of the liner consists of a spherical dome element 42 substantially closing the inlet end of the liner, and supported by an annular truncated cone shaped supporting member 44 secured at its downstream edge 46 to the dome and adjacent its upstream edge 48 to the supporting struts 30. Suitably surrounding the dome at its radially outer edge is an annular fuel manifold 50 connected by a tubular fuel conduit 52 to an additional fuel conduit 54 within one of the tubular support struts 30, as shown, the manifold and strut as well as the engine casing being suitably apertured at 56, 58 and 60 to supply the manifold with fuel from an afterburner fuel supply line (not shown) adapted to be connected to an inlet 62 secured to the engine casing.

As seen more particularly in FIGS. 2 and 5, the forward end of the body portion 35 of the liner 18 is secured to and supported from the supporting strut 30 by a number of circumferentially spaced axially extending fuel spray bars 64 connected at their forward ends into the fuel manifold 50, and at their downstream ends 68 to the body portion. As shown more specifically in FIGURES 3 and 4, each of the fuel spray bars consists of two inverted substantially U- or trough-shaped elements 70 and 72 with one overlapping the other or being nested therewith and positioned radially outwardly of the other to form therebetween a fuel conduit 74 opening at one end into the fuel manifold as shown in FIG. 2 and orificed at the end connected to the body portion. The innermost leg portions 76 of outer member 70 are flared as shown in FIG. 4 and axially corrugated as shown in FIG. 3 to provide axially alternating grooves and ridges 78 and 80 and common walls 82, the bottom wall portions 84 of the grooves abutting the legs 86 of the inner spray bar member 72 and being rigidly connected thereto by suitable means such as rivets 88. With this construction, the ridges 80 and common walls 82 together with the leg portions 86 of member 72 define hollow passages 90 therebetween for the passage of fuel from the conduit or passage 74 into the central portion of liner 18. The passages 90 provided by the corrugations are of such an area as to constitute restrictions to the passage of fuel therethrough thereby constituting in effect fuel nozzles spraying the fuel into the liner to efficiently atomize the fuel.

As shown in FIG. 5, the circumferential spacing of the spray bars 64 provide openings 92 therebetween for the passage of exhaust gases therethrough into the combustion liner to mix with the fuel sprayed thereinto by the spray bar nozzles to form a combustible mixture therein, which upon ignition produces exhaust gases in the outlet 34 with a consequential forward thrust on the engine.

As thus far described, no limitation has been placed on the amount of exhaust gases passing into the liner through openings 92 to combine with the fuel spray therein. If only a small amount of thrust augmentation is desired by afterburning, a small quantity of fuel injected therein would appear to provide the proper solution. However, assuming the case where the entire volume of exhaust gas discharged from the turbine into the afterburner section is to be mixed with the fuel for afterburning, a low fuel-air ratio would result which produces a low combustion efficiency, is wasteful as well as uneconomical, and is unreliable as to the precise amount of thrust augmentation provided. If the fuel-air ratio is increased to a value rendering a satisfactory combustion efficiency, the quantity of fuel supplied to and burned in the can 18 is of such large amount that excessive thrust augmentation is produced. This invention eliminates the above mentioned problems by diverting some of the exhaust gases away from the normal path and into the afterburner combustion liner for mixing with the fuel, while by-passing the remainder of the gases into the exhaust nozzle. This diversionary action raises the fuel-air ratio to a satisfactory level since only a small quantity of gas is being used. The exhaust gases diverted for flow into the combustion liner are then diffused by a construction to be described to present the gases for mixture with the fuel in the most efficient manner. Since there is no need for diffusing the remainder of the exhaust gases, these gases pass into the exhaust nozzle through a passage substantially constant in cross section.

Referring now to FIG. 2, the afterburner section 14 is divided into two gas flow passages 94 and 96 by an annular dividing or flow splitter wall 98 secured to the supporting struts 30 near one edge and to the outlet end 34 of the combustion liner 18 at the other edge. The wall 98 substantially parallels the engine casing 28 to provide the passage 94 therebetween of constant cross-sectional area so that, as stated before, the exhaust gases passing therethrough from the turbine into the exhaust nozzle will not be diffused, i.e., the velocity and dynamic pressure energy thereof will not be reduced. The wall 98 and the annular frusto-conical supporting member 44 together define a diffuser section or passage 96 delivering the exhaust gases from the turbine into the openings 92 in the liner 18 between the fuel spray bars. The area of this diffuser section 96 increases progressively from the inlet end 100 to the outlet 102, and is so designed that the angles of divergence of the walls 98 and 44 with respect to the centerline therebetween provide the most efficient divergence of the gases to eliminate any swirl component, reduce the velocity of the gases, and convert the dynamic pressure energy to static pressure energy at the inlet to the liner.

The portions of each of the supporting struts 30 between the wall 44 and engine casing 28 are surrounded by a streamline fairing or conduit 104 so as to minimize any drag, etc., that will exist because of the presence of the strut in the gas flow path.

While no means has been shown for ignition of the fuel-air mixture in the combustion liner 18, and any one of several known methods may be used, it is preferred in this construction to utilize the hot-streak ignition method wherein additional fuel may be fed into either the main engine combustion liners or into the turbine section aft of the rotor stages to extend the flame therein through passage 96 into the inlet of the liner 18 to ignite the fuel-air mixture therein.

A brief description of the general operation of the afterburner of this invention will now be given to fully explain the cooperation of the several elements therein. Under normal engine flight conditions, without afterburning, the exhaust gases from the last stage of the turbine assembly 12 pass into both the gas passages 94 and 96 and out into the exhaust nozzle 16 to produce a predetermined forward thrust on the engine to propel it accordingly. When it is desired to provide additional thrust by afterburning, the operator or pilot may actuate a switch (not shown) to feed or supply after burner fuel into the fuel manifold 50 through lines 56, 58 and 60, whereupon the fuel enters the spray bars 64 of FIGURE 4 and is sprayed therefrom through the nozzle openings 90 into the interior of the liner 18. Simultaneously, the flow splitter wall 98 diverts some of the exhaust gases into the conical-like diffuser passage 96 wherein the gases are diffused as previously described and enter the openings 92 to thoroughly mix with the fuel spray to form a combustible mixture. This mixture is then ignited by the hot-streak ignition method, and the resulting gas products of combustion create a thrust in the outlet end 34 which when added to the thrust provided by the gases passing through the passage 94 into the exhaust nozzle 16 produces the desired new thrust level and acceleration.

It is to be noted that the combining of the exhaust gases from the liner 18 at the outlet 32 with the gases in passage 94 is without incident other than the lower temperatured gases in passage 94 reducing the temperatures of the liner exhaust gases. It is also to be noted that the percentage of exhaust gas diverted from the main flow is less than thirty percent.

From the foregoing it will be seen therefore that this invention provides afterburning permitting complete control as to the degree of additional thrust provided. The invention furthermore accomplishes this result in a highly efficient and economical manner by utilizing only that amount of fuel and air that is necessary to produce the most efficient combustion to product the additional thrust desired. While the invention has been illustrated in its preferred environment in FIGURES 1–5 inclusive, it will be obvious to those skilled in the art to which this invention pertains that many modifications may be made thereto without departing from the scope of the invention.

We claim:

1. An afterburner combustion apparatus for a turbo-machine having a turbine, an exhaust nozzle, and an afterburner section therebetween, comprising means conducting the exahust gases discharged from the turbine to the exhaust nozzle, an annular casing for said machine, and means for diverting a portion of said gases, said afterburner section including a combustion liner therein for the combustion of fuel therein, said liner having an inlet adjacent one end, a body portion and an open outlet at the other end, said inlet including a dome-shaped element substantially closing one end of said liner, an annular fuel manifold surrounding said inlet and connected to said element, means securing said element to said body portion, said last-named means including circumferentially spaced axially extending individual fuel spray bars each having spaced axial openings feeding fuel into said inlet and connected at one end to said manifold, said circumferential spacing providing openings between said spray bars for the flow of gas therethrough, means supplying fuel to said manifold, said fuel combining with said gases to form a combustible mixture, means for igniting said mixture, said means diverting a portion of said gases comprising a conical-like annular conduit means having gas entrance and exit portions, said entrance portion being positioned in communication with said exhaust gases, means connecting said outlet to said liner to direct said gases into said openings between said spray bars, said conduit means having one wall substantially paralleling said casing providing a passage of substantially constant cross-sectional area therebetween for the passage of said exhaust gases therethrough, said conduit means diffusing the gases passing therethrough reducing the velocity and dynamic pressure thereof, the products of combustion in said liner upon ignition of said mixture producing a thrust augmenting the thrust produced by the flow of said undiverted gases through said passage.

2. A combustion apparatus comprising a combustion chamber containing gas under pressure, a tubular combustion liner in communication therewith having an inlet adjacent one end, a body portion and an open outlet at the other end, a fuel conduit containing fuel under pressure, connecting means conducting the fuel in said conduit to said inlet, said inlet having openings therein for the admission of gas therethrough from said chamber, said fuel and gas in said duct combining to form a combustible mixture therein, means for igniting said mixture, said inlet including a dome-shaped element axially beyond said liner and substantially closing the one end of said liner, and means securing said element to said body portion, said means including axially extending fuel spray bars opening into said inlet and connected at one end to said connecting means.

3. A combustion apparatus comprising a combustion chamber containing gas under pressure, a tubular combustion liner in communication therewith having an inlet adjacent one end, a body portion and an open outlet at the other end, a fuel conduit containing fuel under pressure, connecting means conducting the fuel in said conduit to said inlet, said inlet having openings therein for the admission of gas therethrough from said chamber, said fuel and gas in said duct combining to form a combustible mixture therein, means for igniting said mixture, said inlet including a dome-shaped element axially beyond said liner and substantially closing the one end of said liner, said connecting means comprising an annular fuel manifold surrounding said inlet and connected to said element, and means securing said element to said body portion, said means including a plurality of circumferentially spaced axially extending individual fuel spray bars opening into said inlet and connected at one end to said manifold, said circumferential spacing providing openings therebetween for the said flow of gas therethrough from said chamber.

4. A combustion apparatus comprising a combustion chamber containing gas under pressure, a tubular combustion liner in communication therewith having an inlet adjacent one end, a body portion and an open outlet at the other end, a fuel conduit containing fuel under pressure, connecting means conducting the fuel in said conduit to said inlet, said inlet having openings therein for the admission of gas therethrough from said chamber, said fuel and gas in said duct combining to form a combustible mixture therein, means for igniting said mixture, said inlet including a dome-shaped element substantially closing the one end of said liner, said connecting means comprising an annular fuel manifold surrounding said inlet and connected to said element, means securing said element to said body portion, said means including circumferentially spaced axially extending fuel spray bars opening into said inlet and connected at one end to said manifold, said circumferential spacing providing openings therebetween for the said flow of gas therethrough from said chamber, said spray bars each comprising a plurality of overlapping trough-shaped elements positioned one radially outwardly of the other, means formed on one of said elements cooperating with another element to form a fuel passage therebetween for the delivery of fuel into said liner from said mainfold.

5. A combustion apparatus comprising a combustion chamber containing gas under pressure, a tubular combustion liner in communication therewith having an inlet adjacent one end, a body portion and an open outlet at the other end, a fuel conduit containing fuel under pressure, connecting means conducting the fuel in said conduit to said inlet, said inlet having openings therein for the admission of gas therethrough from said chamber, said fuel and gas in said duct combining to form a combustible mixture therein, means for igniting said mixture, said inlet including a dome-shaped element substantially closing the one end of said liner, said connecting means comprising an annular fuel manifold surrounding said inlet and connected to said element, means securing said element to said body portion, said means including circumferentially spaced axially extending fuel spray bars opening into said inlet and connected at one end to said manifold, said circumferential spacing providing openings therebetween for the said flow of gas therethrough from said chamber, said spray bars each comprising overlapping trough-shaped elements positioned one radially outwardly of the other, means formed on one of said elements cooperating with the other element to form a fuel nozzle therebetween, said last named means comprising corrugations forming axially alternating ridged and grooved portions, said groove portions abutting portions of the adjacent element, and being secured thereto, said ridge portions and adjacent element portions cooperating to form said fuel nozzle therebetween for the delivery of fuel into said liner from said manifold.

6. A combustion apparatus comprising a combustion chamber containing gas under pressure, a tubular combustion liner in communication therewith having an inlet adjacent one end, a body portion and an open outlet at the other end, a fuel conduit containing fuel under pressure, connecting meas conducting the fuel in said conduit to said inlet, said inlet having openings therein for the admission of gas therethrough from said chamber, said fuel and gas in said duct combining to form a combustible mixture therein, means for igniting said mixture, said inlet including a dome-shaped element substantially closing the one end of said liner, said connecting means comprising an annular fuel manifold surrounding said inlet and connected to said element, means securing said element to said body portion, said means including circumferentially spaced axially extending fuel spray bars opening into said inlet and connected at one end to said manifold, said circumferential spacing providing openings therebetween for the said flow of gas therethrough from said chamber, said spray bars each comprising nested trough-shaped elements positioned one radially outwardly of the other, one of said elements having flared radially inner end portions paralleling the radially inner end portions of the overlapped adjacent element to form a fuel passage therebetween, said one element flared portions being corrugated forming axially alternating ridges and grooves portions, said groove portions abutting the end portions of said adjacent element, means connecting said abutting end and groove portions, said ridge portions and adjacent element end portions cooperating to form said fuel passages therebetween for the delivery of fuel into said duct from said manifold.

7. An afterburner combustion apparatus for a turbo-machine having a turbine, an exhaust nozzle, and an afterburner section therebetween, comprising means conducting the exhaust gases discharged from the turbine to the exhaust nozzle, an annular casing for said machine, and means for diverting a portion of said gases, said afterburner section including a combustion liner therein for the combustion of fuel therein, means supplying fuel to said liner, said fuel combining with said diverted gases to form a combustible mixture, means for igniting said mixture, said means diverting a portion of said gases comprising a conical-like annular conduit means having a gas inlet in communication with said exhaust gases and an outlet connected to said liner, said conduit means having an outer wall extending from said inlet to the outlet end of the liner and connected thereto and substantially paralleling said casing and an inner wall extending from said inlet to the opposite end of said liner and connected thereto, said inner wall constituting a segment of a hollow sphere, the gas flow area between said walls increasing progressively and uniformly upon an increase in the distance from said inlet to said outlet to effectively diffuse said diverted gases reducing the velocity and dynamic pressure thereof, the products of combustion in said liner upon ignition of said mixture producing a thrust augmenting the thrust produced by the flow of said undiverted gases through said exhaust nozzle.

8. An afterburner for a turbomachine having a turbine, an exhaust nozzle and an afterburner section therebetween means conducting the exhaust gases discharged from the turbine to the exhaust nozzle, a combustion liner in said afterburner section for the combustion of fuel therein comprising a tubular open end body portion having an inlet at one end and an outlet at the other end, means for diverting a portion of said gases into said inlet, conduit means supplying fuel to said inlet, a dome-shaped element axially beyond the inlet end of said body portion partially closing said inlet end, and means securing said element to said body portion including axially extending fuel spray bars opening radially into the space between said element and body portion, said fuel combining with said diverted gases to form a combustible mixture in said liner, means for igniting said mixture, said means diverting a portion of said gases diffusing said dverted gases reducing the velocity and dynamic pressure thereof, the products of combustion in said liner upon ignition of said mixture creating a thrust augmenting the thrust produced by the flow of said undiverted gases through said exhaust nozzle.

9. A combustion chamber for use in a fluid environment comprising a tubular body portion having an open outlet and a dome-shaped cover closing the opposite inlet end, said cover being axially separated from the body portion and joined thereto by a plurality of circumferentially arranged and spaced axially extending fuel spray bars each secured at opposite axial ends to the edge of said cover and to the body portion respectively, each of said spray bars having a plurality of radially inwardly directed openings, a source of fuel, and means connecting said fuel to each of said spray bars, the spaces between spray bars admitting fluid into said chamber to mix with said fuel.

10. A combustion chamber for use in a fluid environment comprising a tubular body portion having an open outlet end and a dome-shaped cover closing the opposite inlet end, said cover comprising a segment of a hollow sphere axially separated from the body portion and joined thereto by a plurality of circumferentially arranged and spaced axially extending fuel spray bars each secured at opposite axial ends to the edge of said segment and to the body portion respectively, each of said spray bars having a plurality of radially inwardly directed openings, a source of fuel, and means connecting said fuel to each of said spray bars, the spaces between spray bars admitting fluid into said chamber to mix with said fuel.

11. A combustion chamber for use in a fluid environment comprising a tubular body portion having an open outlet end and a dome-shaped cover closing the opposite inlet end, said cover comprising a coaxially located dished member axially separated from the body portion and joined thereto by a plurality of circumferentially arranged and spaced longitudinally extending fuel spray bars each secured at opposite axial ends to the edge of said segment and to the body portion respectively, each of said spray bars having a plurality of axially spaced radially inwardly directed spray nozzles, a source of fuel, and means connecting said fuel to each of said spray bars, the spaces between spray bars admitting fluid into said chamber to mix with said fuel.

References Cited in the file of this patent

UNITED STATES PATENTS

| | | |
|---|---|---|
| 2,508,420 | Redding | May 23, 1950 |
| 2,556,161 | Bailey et al. | June 12, 1951 |
| 2,679,137 | Probert | May 25, 1954 |
| 2,851,859 | Foure | Sept. 16, 1958 |
| 2,914,912 | Woll | Dec. 1, 1959 |

FOREIGN PATENTS

| | | |
|---|---|---|
| 628,366 | Great Britain | Aug. 26, 1949 |
| 666,944 | Great Britain | Feb. 10, 1952 |
| 715,197 | Great Britain | Sept. 8, 1954 |